US010000339B2

(12) United States Patent
Ciliberti, Jr. et al.

(10) Patent No.: US 10,000,339 B2
(45) Date of Patent: Jun. 19, 2018

(54) GRAVITY-FED HOUSING FOR GASIFICATION SYSTEM

(71) Applicant: Lockheed Martin Corporation, Bethesda, MD (US)

(72) Inventors: Carlo S. Ciliberti, Jr., Lumberton, NJ (US); Donald R. Forgie, Philadelphia, PA (US); Gautam Gandhi, Morganville, NJ (US); Michael I. Palestini, Bensalem, PA (US); Paul J. Sullivan, Hatfield, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 19 days.

(21) Appl. No.: 14/790,759

(22) Filed: Jul. 2, 2015

(65) Prior Publication Data

US 2017/0001802 A1  Jan. 5, 2017

(51) Int. Cl.
*B65G 11/00* (2006.01)
*B65G 47/18* (2006.01)
(Continued)

(52) U.S. Cl.
CPC .......... *B65G 11/206* (2013.01); *B65G 11/026* (2013.01); *C10J 3/26* (2013.01);
(Continued)

(58) Field of Classification Search
None
See application file for complete search history.

(56) References Cited

U.S. PATENT DOCUMENTS 4,009,912 A * 3/1977 Mraz .............. B65G 53/14
406/11
6,932,554 B2 * 8/2005 Isfort ............... A01D 43/087
193/16
(Continued)

FOREIGN PATENT DOCUMENTS

EP  0555501 A1  8/1993
EP  1120605 A1  8/2001
(Continued)

OTHER PUBLICATIONS

Author Unknown, "H-Series—Air", Installation Manual, Stock No. 10-0024-089, Serial No. 8.8430, Published at least as early as Jun. 5, 2015, Plattco Corporation, 22 pages.
(Continued)

*Primary Examiner* — Kavel Singh
(74) *Attorney, Agent, or Firm* — Withrow & Terranova, PLLC

(57) ABSTRACT

A gravity-fed housing for use in a gasification system is disclosed. The gravity-fed housing has a receiving end panel that forms a receive opening in a first plane. The receive opening is configured to receive a first plurality of heat carriers via gravity. The gravity-fed housing includes a siding connected to the receiving end panel. The siding forms a chamber and a discharge opening in a second plane that is parallel to the first plane. The discharge opening is offset with respect to the receive opening such that a line perpendicular to the receiving end panel that extends through a center point of the receive opening does not intersect a center point of the second opening. The siding includes a first panel that comprises a guiding surface that intersects the line and is angled toward the discharge opening.

18 Claims, 16 Drawing Sheets

(51) Int. Cl.
  *B65G 11/20*   (2006.01)
  *C10J 3/26*    (2006.01)
  *C10J 3/30*    (2006.01)
  *C10J 3/72*    (2006.01)
  *B65G 11/02*   (2006.01)

(52) U.S. Cl.
  CPC .............. *C10J 3/30* (2013.01); *C10J 3/723* (2013.01); *C10J 2300/0993* (2013.01); *F23G 2900/50009* (2013.01)

(56) References Cited

U.S. PATENT DOCUMENTS 8,376,184 B2 * 2/2013 Buchstab ................ F25C 5/005
                                                       222/146.1
9,296,562 B1 * 3/2016 Van Bogaert .......... B65G 11/02
2014/0305357 A1 * 10/2014 Desellem .................. F23C 1/10
                                                       110/347

FOREIGN PATENT DOCUMENTS

EP        2765177 A1    8/2014
WO     2004078879 A1    9/2004

OTHER PUBLICATIONS

Extended European Search Report for European Patent Application No. 16177584.6, dated Nov. 4, 2016, 8 pages.
Examination Report for European Patent Application No. 16177584.6, dated Nov. 13, 2017, 7 pages.
Examination Report for European Patent Application No. 16177584.6, dated Apr. 9, 2018, 5 pages.

* cited by examiner

GRAVITY-FED HOUSING FOR GASIFICATION SYSTEM

TECHNICAL FIELD

The embodiments relate generally to a gravity-fed gasification system, and in particular to a gravity-fed housing utilized in a gravity-fed gasification system.

BACKGROUND

There is increasing interest in the development of efficient and environmentally friendly processes for eliminating waste. One such process involves gasification. Gasification can convert waste to syngas, which may be used, for example, by an internal combustion engine to generate electricity, for conversion to biofuels, or for hydrogen production. A gasification plant is typically oriented vertically to conserve land use and to reduce parasitic load. The gasification process is gravity-fed and takes place in stages in a vertical stack of components. The stages can include, for example, a pre-heater stage implemented in a pre-heater component, a reformer stage implemented in a reformer component, a pyrolyzer stage implemented in a pyrolyzer component, and a separator stage implemented in a separator component. Each of these components may be coupled to one another in a stack via additional components such as valve components and Dutchman components. The cumulative vertical length of these components can result in a gasification system that has a substantial height, and, in some locations, this height may approach or exceed zoning restrictions.

SUMMARY

The embodiments relate to a Dutchman, referred to herein as a gravity-fed housing, that includes eccentric openings and an angled interior surface that substantially reduces a height of the gravity-fed housing compared to conventional Dutchmen but retains sufficient volume to contain a requisite volume of heat carriers necessary for a downstream gasification component.

In some embodiments, the gravity-fed housing includes a purge gas inlet and a purge gas outlet that facilitate purging oxygen from the gravity-fed housing to ensure oxygen is not released into downstream components.

In one embodiment, a system is provided. The system includes a gravity-fed housing that has a receive end and a discharge end. The gravity-fed housing has a receiving end panel that forms a receive opening in a first plane. The receive opening is configured to receive a first plurality of heat carriers via gravity. The gravity-fed housing includes a siding connected to the receiving end panel. The siding forms a chamber and a discharge opening in a second plane that is parallel to the first plane. The discharge opening is offset with respect to the receive opening such that a line perpendicular to the receiving end panel that extends through a center point of the receive opening does not intersect a center point of the second opening. The siding includes a first panel that comprises a guiding surface that intersects the line and is angled in a direction toward the discharge opening.

In one embodiment, the siding further includes a second panel, a third panel, and a fourth panel, the second panel opposing the first panel and being in a plane that is non-perpendicular to the first plane, the third panel and the fourth panel opposing one another and being perpendicular to the first plane.

In one embodiment, the siding forms a purge gas inlet configured to allow a purge gas to enter the gravity-fed housing, and a purge gas outlet configured to allow the purge gas to be discharged from the gravity-fed housing.

In one embodiment, a receiving flap mechanism is coupled to the receive end of the gravity-fed housing. The receiving flap mechanism includes a first flap controller and a receiving flap. The first flap controller is configured to selectively open the receiving flap to release the first plurality of heat carriers into the gravity-fed housing via the receive opening, and close the receiving flap to inhibit entry of additional heat carriers into the gravity-fed housing.

In one embodiment, a discharging flap mechanism is coupled to the discharge end of the gravity-fed housing. The discharging flap mechanism includes a second flap controller and a discharging flap. The second flap controller is configured to selectively open the discharging flap to release the first plurality of heat carriers from the gravity-fed housing, and close the discharging flap to inhibit discharge from the gravity-fed housing.

In one embodiment, the siding forms a purge gas inlet configured to allow a purge gas to enter the gravity-fed housing, and a purge gas outlet configured to allow the purge gas to be discharged from the gravity-fed housing.

In one embodiment, a purge gas inlet mechanism is fluidically coupled to the purge gas inlet. The purge gas inlet mechanism includes a purge gas inlet controller and a purge gas inlet valve. The purge gas inlet controller is configured to selectively open the purge gas inlet valve to allow entry of the purge gas into the gravity-fed housing, and close the purge gas inlet valve to prevent entry of the purge gas into the gravity-fed housing.

In one embodiment, a purge gas outlet mechanism is fluidically coupled to the purge gas outlet. The purge gas outlet mechanism includes a purge gas outlet controller and a purge gas outlet valve. The purge gas outlet controller is configured to selectively open the purge gas outlet valve to allow discharge of the purge gas from the gravity-fed housing, and close the purge gas outlet valve to prevent discharge of the purge gas from the gravity-fed housing.

In one embodiment, the system includes a system controller that is communicatively coupled to the receiving flap mechanism, the discharging flap mechanism, the purge gas inlet mechanism, and the purge gas outlet mechanism. The system controller is configured to control the receiving flap mechanism, the discharging flap mechanism, the purge gas inlet mechanism, and the purge gas outlet mechanism to close the purge gas inlet valve and the purge gas outlet valve, close the discharging flap, and open the receiving flap to allow the first plurality of heat carriers to enter the chamber.

In some embodiments, the system controller is further configured to control the receiving flap mechanism, the discharging flap mechanism, the purge gas inlet mechanism, and the purge gas outlet mechanism to close the receiving flap, open the purge gas inlet valve and the purge gas outlet valve for a first period of time, close the purge gas outlet valve, close the purge gas inlet value, and open the discharging flap to allow the first plurality of heat carriers to be discharged via gravity from the chamber.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first plane" and "second plane," and does not imply a priority, a type, an importance, or other attribute, unless otherwise stated herein. The term "about" used herein in conjunction with a numeric value means any value that is within a range of ten percent greater than or ten percent less than the numeric value.

The embodiments relate to a Dutchman, referred to herein as a gravity-fed housing, that includes eccentric openings and an angled interior surface that substantially reduces a height of the gravity-fed housing compared to conventional Dutchmen but retains sufficient volume to contain a requisite volume of heat carriers necessary for a downstream gasification component. In some embodiments, the gravity-fed housing of the present embodiments can be 18 inches shorter than a conventional, cylindrical gravity-fed housing.

Figure 1:
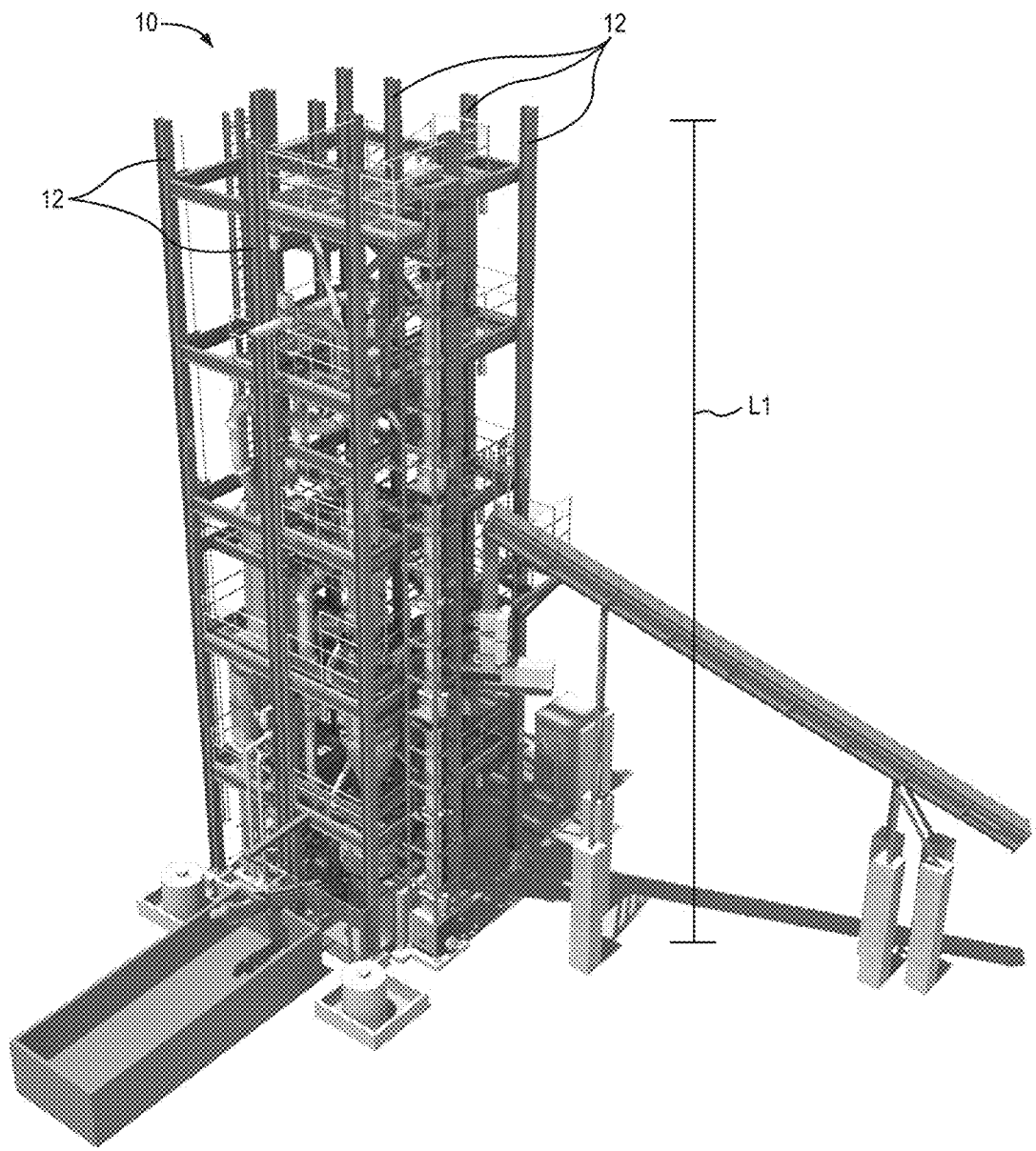
FIG. 1 is a diagram illustrating a gravity-fed gasification system according to one embodiment.

FIG. 1 is a diagram illustrating a gravity-fed gasification system 10 according to one embodiment. The gravity-fed gasification system 10 is illustrated with support structures, in particular, a plurality of steel columns 12, that support a number of stacked components of the gravity-fed gasification system 10. The gravity-fed gasification system 10 has a vertical length L1.

Figure 2:
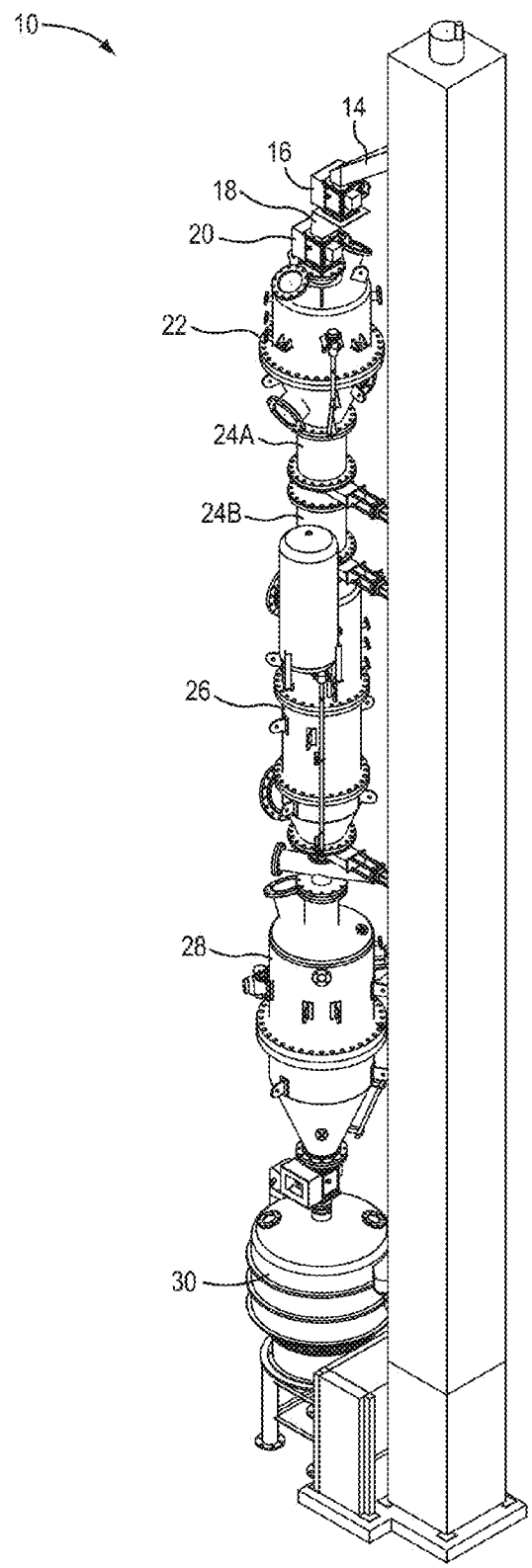
FIG. 2 is a diagram illustrating components of the gravity-fed gasification system illustrated in FIG. 1 with steel columns and other structures and/or components omitted for purposes of illustration.

FIG. 2 is a diagram illustrating components of the gravity-fed gasification system 10 illustrated in FIG. 1 with the plurality of steel columns 12 and other structures and/or components omitted for purposes of illustration. At or near a top of the gravity-fed gasification system 10 is a chute 14 through which heat carriers (not illustrated) are provided to a flap mechanism 16. The heat carriers are typically spherical in shape and comprise a material suitable for heating to temperatures in excess of, for example, 1900 degrees Fahrenheit. In some embodiments, the heat carriers comprise alumina oxide, but the embodiments are not limited to any particular shape of heat carrier or to heat carriers made of any particular material.

The flap mechanism 16 includes a flap controller (not illustrated) that selectively opens a flap to release a plurality of the heat carriers into a gravity-fed housing 18 via a receive opening of the gravity-fed housing 18. The flap controller can also selectively close the flap to inhibit entry of additional heat carriers into the gravity-fed housing 18. The gravity-fed housing 18 may go through a purge gas process, discussed below in greater detail, to remove substantially all oxygen that entered the gravity-fed housing 18 when the heat carriers were received by the gravity-fed housing 18.

As will be discussed in greater detail with regard to FIG. 3, the gravity-fed housing 18 is eccentric in that the receive opening of the gravity-fed housing 18 is not directly vertically beneath a discharge opening of the gravity-fed housing 18. A flap mechanism 20 retains the heat carriers in the gravity-fed housing 18 during the purge gas process. The flap mechanism 20 includes a flap controller (not illustrated) that is configured to selectively open a flap to release the heat carriers from the gravity-fed housing 18 and to close the flap to inhibit discharge from the gravity-fed housing 18.

The heat carriers are released into a pre-heater 22 that pre-heats the heat carriers to a desired temperature. The heat carriers are then released into a plurality of sequential gravity-fed housings 24A, 24B. The heat carriers ultimately are fed into a reformer 26. Downstream of the reformer 26 is a pyrolyzer 28 and a separator 30.

Figure 3:
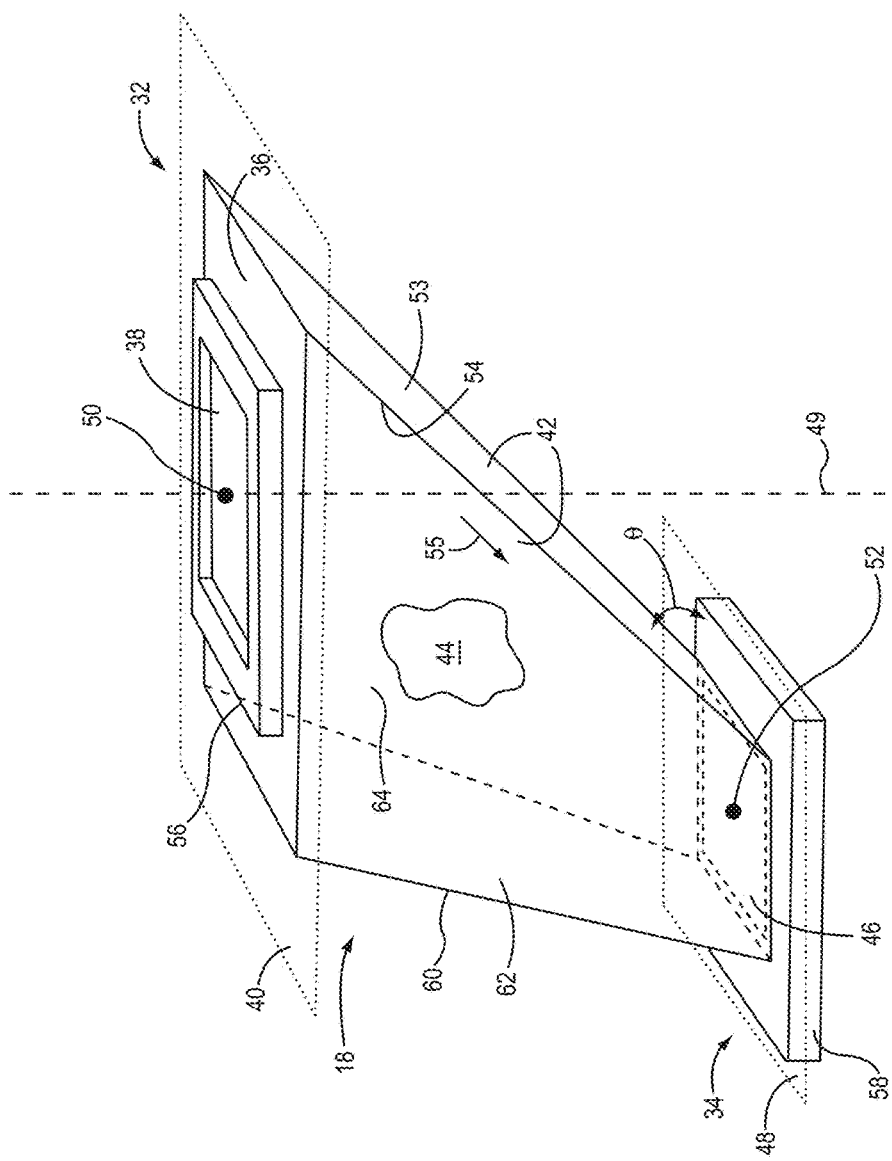
FIG. 3 is a diagram of the gravity-fed housing illustrated in FIG. 2 in greater detail according to one embodiment.

FIG. 3 is a diagram of the gravity-fed housing 18 illustrated in FIG. 2 in greater detail, according to one embodiment. The gravity-fed housing 18 includes a receive end 32 and a discharge end 34. A receiving end panel 36 forms a receive opening 38 in a first plane 40. The receive opening 38 is configured to receive a first plurality of heat carriers (not illustrated) via gravity. A siding 42 is connected to the receiving end panel 36. The siding 42 forms a chamber 44 and a discharge opening 46 in a second plane 48 that is parallel to the first plane 40. The discharge opening 46 is offset, or eccentric, with respect to the receive opening 38 in a direction of gravity such that a line 49 perpendicular to the receiving end panel 36 that extends through a center point 50 of the receive opening 38 does not intersect a center point 52 of the discharge opening 46.

The siding 42 includes a first panel 53 that comprises a guiding surface 54 that intersects the line 49 that extends through the center point 50 of the receive opening 38 and is angled in a direction 55 toward the discharge opening 46. The guiding surface 54 is configured to guide heat carriers gravity-fed into the receive opening 38 to the discharge opening 46. In some embodiments, the first panel 53 extends from the receiving end panel 36 to the discharge opening 46. In some embodiments, the gravity-fed housing 18 includes flanges 56, 58 for coupling to upstream and downstream components, respectively. The guiding surface 54 is preferably at an angle that is greater than an angle of repose of the heat carriers, such that the heat carriers, if unimpeded, will slide toward the discharge opening 46. In one embodiment, the first panel 53 is at an angle θ with respect to the second plane 48 that is greater than about 40 degrees.

In one embodiment, the siding 42 further includes a second panel 60 that opposes the first panel 53 and is in a plane that is non-perpendicular to the first plane 40. In one embodiment, the second panel 60 may be configured to be at an angle that is based on a desired internal volume of the gravity-fed housing 18. The siding 42 also includes a third panel 62 and a fourth panel 64 opposing one another and being perpendicular to the first plane 40.

While the dimensions of the gravity-fed housing 18 may differ depending on a number of factors, including a desired interior volume, in one embodiment the gravity-fed housing 18 is about 16 inches tall and about 17 inches wide at a widest point.

Figure 4:
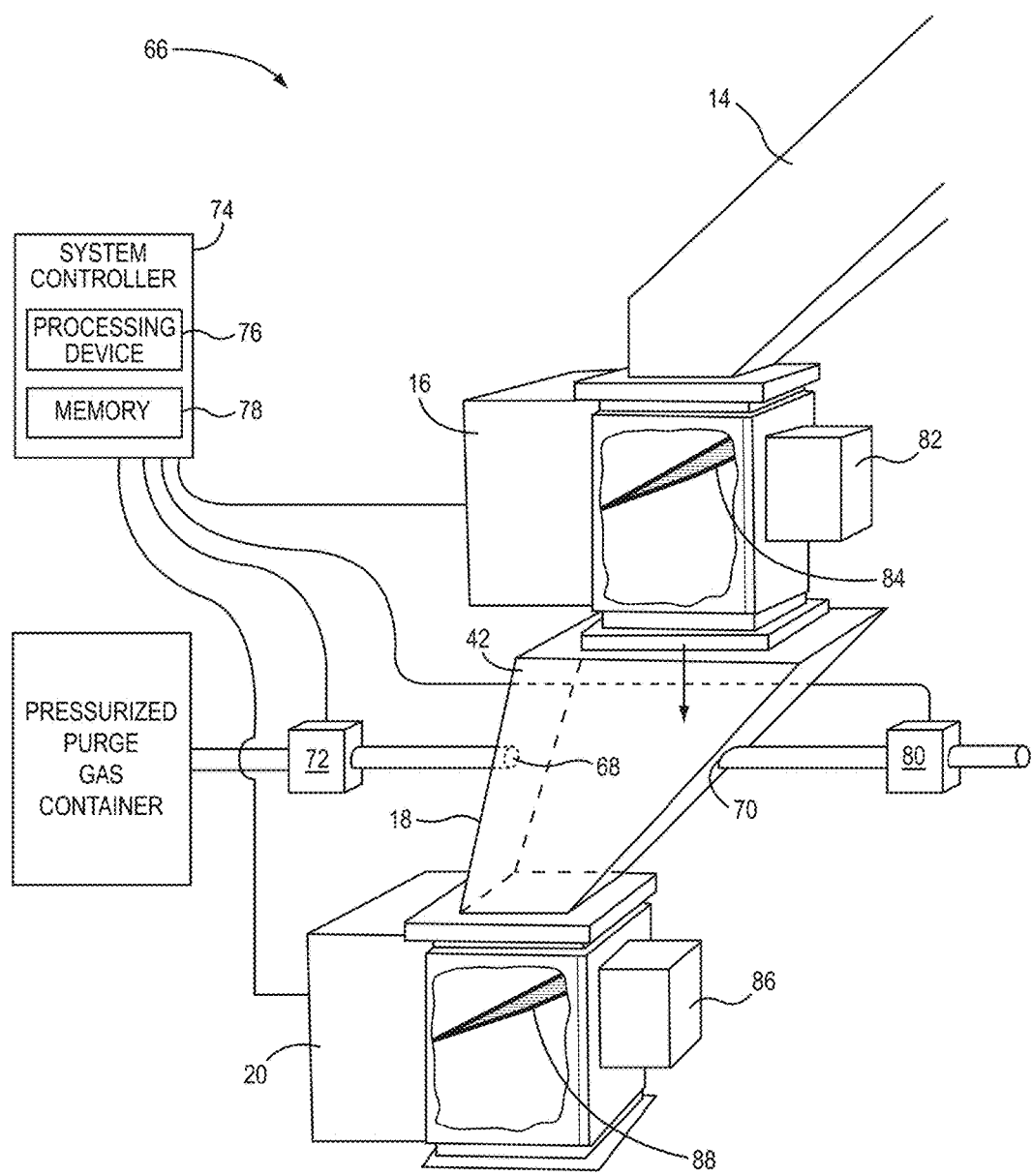
FIG. 4 is a block diagram of a system according to one embodiment.

FIG. 4 is a block diagram of a system 66 according to one embodiment. The system 66 includes the gravity-fed housing 18, the flap mechanism 16, and the flap mechanism 20. The flap mechanism 16 may be referred to herein as the receiving flap mechanism 16 because the gravity-fed housing 18 receives the heat carriers via the receiving flap mechanism 16. The flap mechanism 20 may be referred to herein as the discharging flap mechanism 20 because the gravity-fed housing 18 discharges the heat carriers via the discharging flap mechanism 20.

In one embodiment, the siding 42 forms a purge gas inlet 68 that is configured to allow a purge gas to enter the gravity-fed housing 18. The siding 42 also forms a purge gas outlet 70 that is configured to allow the purge gas to be discharged from the gravity-fed housing 18. A purge gas inlet mechanism 72 comprising a purge gas controller and a purge gas inlet valve is fluidically coupled to the purge gas inlet 68. The purge gas controller is configured to selectively open the purge gas inlet valve to allow entry of the purge gas into the gravity-fed housing 18 via the purge gas inlet 68, and to close the purge gas inlet valve to prevent entry of the purge gas into the gravity-fed housing 18.

In one embodiment, a system controller 74 provides signals to the purge gas controller directing the purge gas controller to either open the purge gas inlet valve or close the purge gas inlet valve in accordance with a sequence of steps, as described in greater detail below. In one embodiment, the system controller 74 includes a processing device 76, such as a general purpose processor or microprocessor, and a memory 78. The memory 78 may, in some embodiments, include complex programming instructions that, when executed by the processing device 76, implement some or all of the control signal functionality described herein with regard to the system 66. In other embodiments, the system controller 74 may comprise electronic circuitry configured to implement the control signal functionality described herein with regard to the system 66. Such electronic circuitry may comprise, for example, an application-specific integrated circuit or the like.

A purge gas outlet mechanism 80 comprising a purge gas outlet controller and a purge gas outlet valve is fluidically coupled to the purge gas outlet 70. The purge gas outlet controller is coupled to the system controller 74 and is configured to selectively open the purge gas outlet valve to allow discharge of the purge gas from the gravity-fed housing 18, and close the purge gas outlet valve to prevent discharge of the purge gas from the gravity-fed housing 18, in response to signals received from the system controller 74.

The receiving flap mechanism 16 includes a first flap controller 82 and a receiving flap 84. The first flap controller 82 is communicatively coupled to the system controller 74 and, in response to control signals therefrom, is configured to selectively open the receiving flap 84 to release a first plurality of heat carriers into the gravity-fed housing 18 via the receive opening 38 (FIG. 3) and close the receiving flap 84 to inhibit entry of additional heat carriers into the gravity-fed housing 18. The volume of the heat carriers released into the gravity-fed housing 18 is controlled via a choreographed timing sequence of the receiving flap 84 and the discharging flap 88. In some embodiments, the receiving flap 84 may be opened for a period of time in the millisecond range. In some embodiments, the receiving flap 84, when in a closed position, forms a fluid-tight seal configured to prevent gas from entering or exiting the gravity-fed housing 18 via the receive opening 38.

The discharging flap mechanism 20 includes a second flap controller 86 and a discharging flap 88. The second flap controller 86 is communicatively coupled to the system controller 74 and, in response to control signals therefrom, is configured to selectively open the discharging flap 88 to release the first plurality of heat carriers from the gravity-fed housing 18 and close the discharging flap 88 to inhibit discharge from the gravity-fed housing 18. In some embodiments, the discharging flap 88, when in a closed position, forms a fluid-tight seal configured to prevent gas from entering or exiting the gravity-fed housing 18 via the discharge opening 46.

Figure 5A:
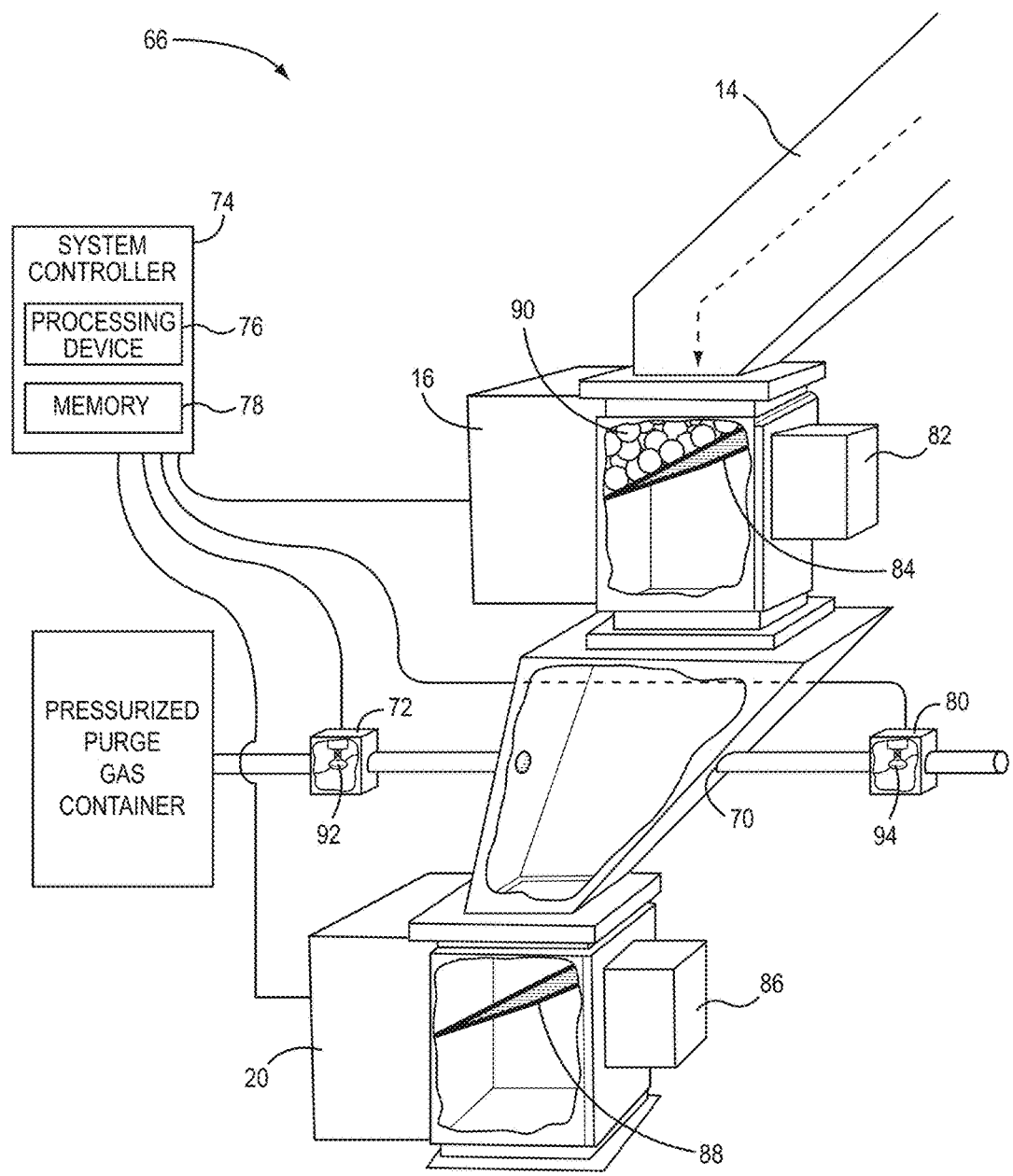
FIGS. 5A-5K are diagrams of the system illustrated in FIG. 4 that collectively illustrate a cycle of processing that occurs according to one embodiment.

FIGS. 5A-5K are diagrams of the system 66 that collectively illustrate a cycle of processing that occurs according to one embodiment. FIG. 5A illustrates the system 66 at an initial stage of a cycle, with a first plurality of heat carriers 90 prevented from entering the gravity-fed housing 18 due to the closed state of the receiving flap 84, the gravity-fed housing 18 empty, and the discharging flap 88 in a closed state. In particular, the system controller 74 initiates signals to control the receiving flap mechanism 16, the discharging flap mechanism 20, the purge gas inlet mechanism 72, and the purge gas outlet mechanism 80 to close a purge gas inlet valve 92 and a purge gas outlet valve 94, close the discharging flap 88, and close the receiving flap 84.

Figure 5B:
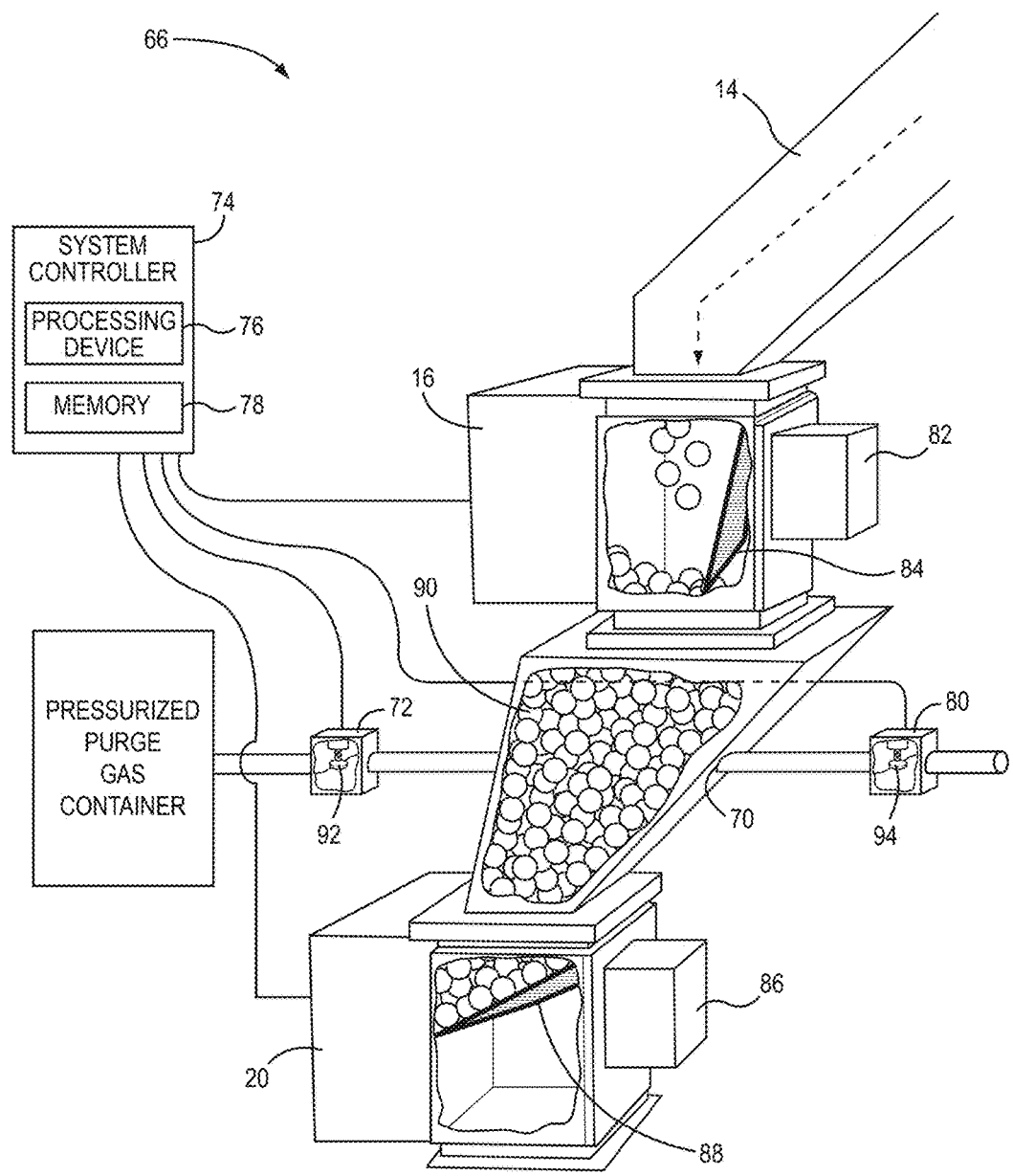

FIG. 5B illustrates a next stage of the cycle according to one embodiment. The system controller 74 initiates signals to control the receiving flap mechanism 16 to open the receiving flap 84 to allow the first plurality of the heat carriers 90 to enter the gravity-fed housing 18. The purge gas inlet valve 92, the purge gas outlet valve 94, and the discharging flap 88 remain closed.

Figure 5C:
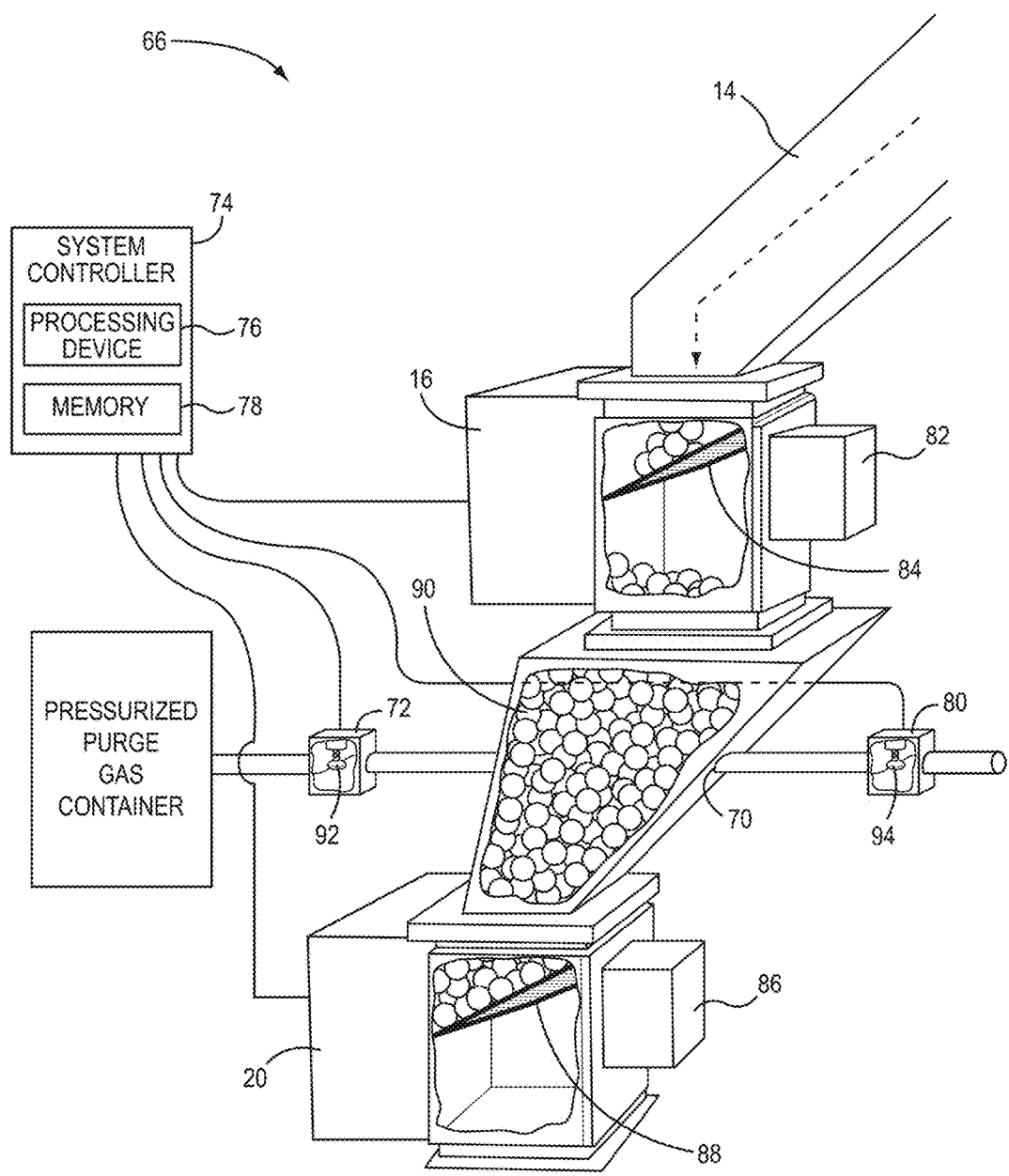

FIG. 5C illustrates a next stage of the cycle according to one embodiment. The system controller 74 initiates signals to control the receiving flap mechanism 16 to close the receiving flap 84 to prevent additional heat carriers from entering the gravity-fed housing 18. The purge gas inlet valve 92, the purge gas outlet valve 94, and the discharging flap 88 remain closed.

Figure 5D:
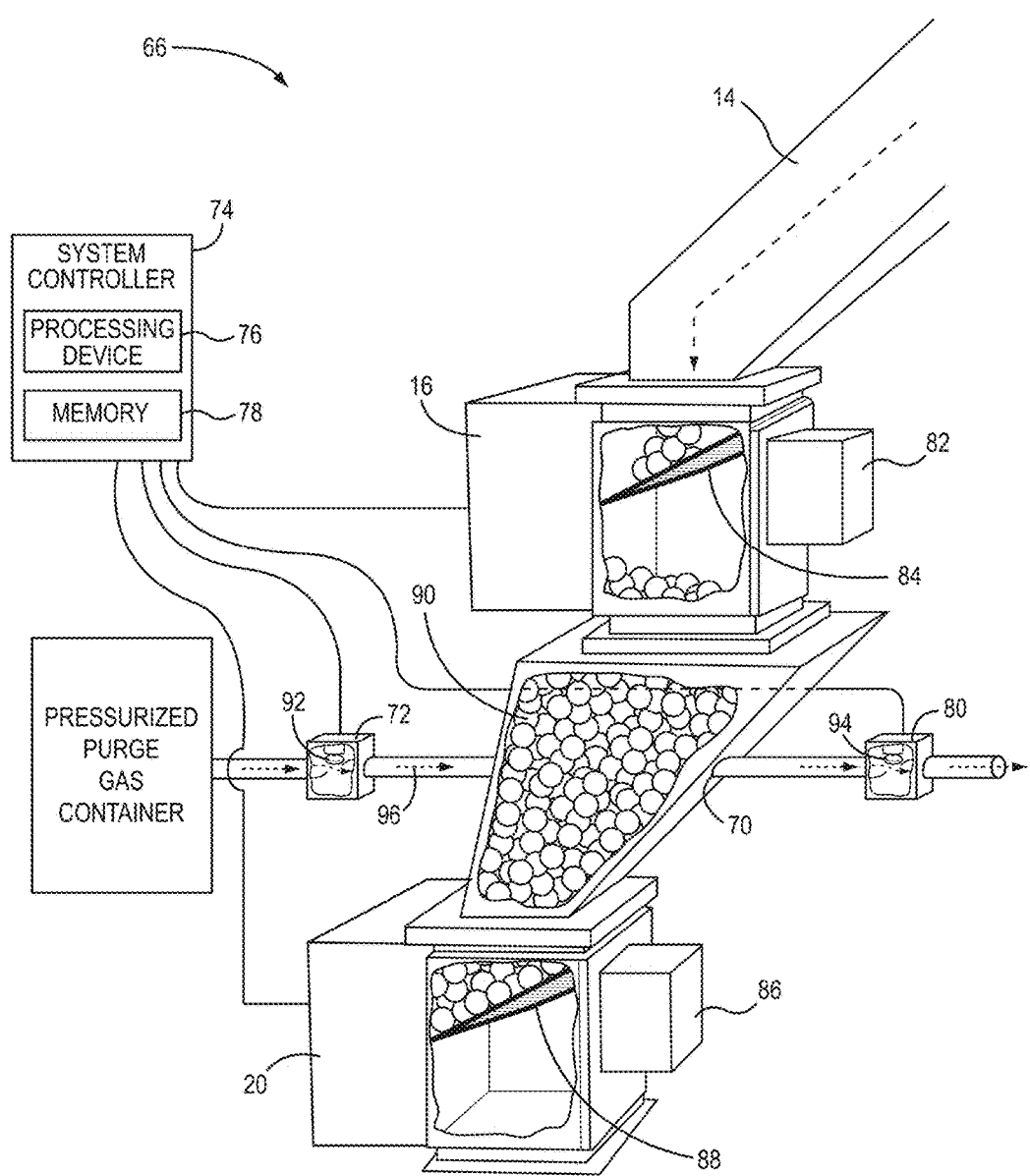

FIG. 5D illustrates a next stage of the cycle according to one embodiment. The system controller 74 initiates signals to control the purge gas inlet mechanism 72 and the purge gas outlet mechanism 80 to open the purge gas inlet valve 92 and the purge gas outlet valve 94. The receiving flap 84 and the discharging flap 88 remain closed. A purge gas 96 enters the gravity-fed housing 18 and flushes any oxygen from the gravity-fed housing 18 out the purge gas outlet valve 94.

Figure 5E:
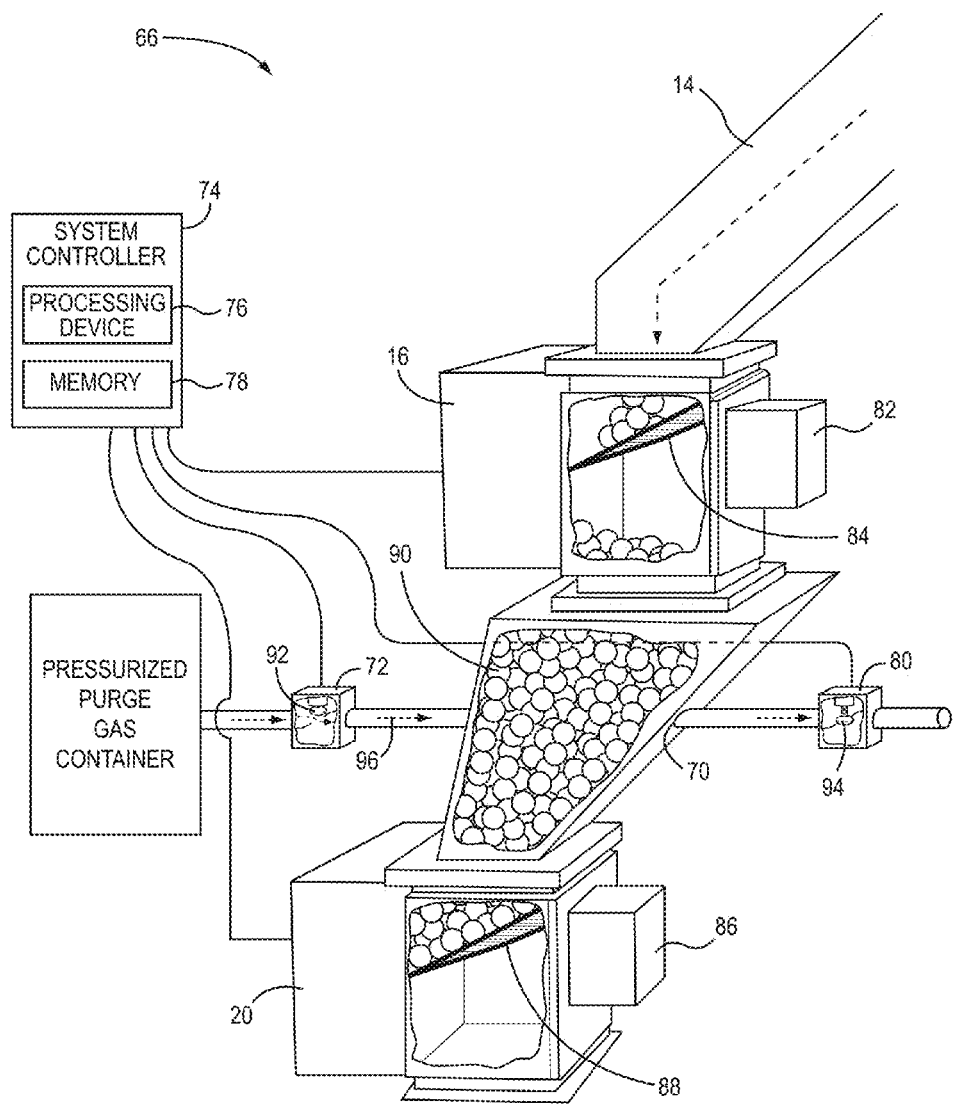

FIG. 5E illustrates a next stage of the cycle according to one embodiment. After a first period of time, the system controller 74 initiates signals to control the purge gas outlet mechanism 80 to close the purge gas outlet valve 94. The purge gas inlet valve 92 remains open for a period of time. The receiving flap 84 and the discharging flap 88 remain closed. In some embodiments, the purge gas inlet valve 92 remains open for about 2 seconds.

Figure 5F:
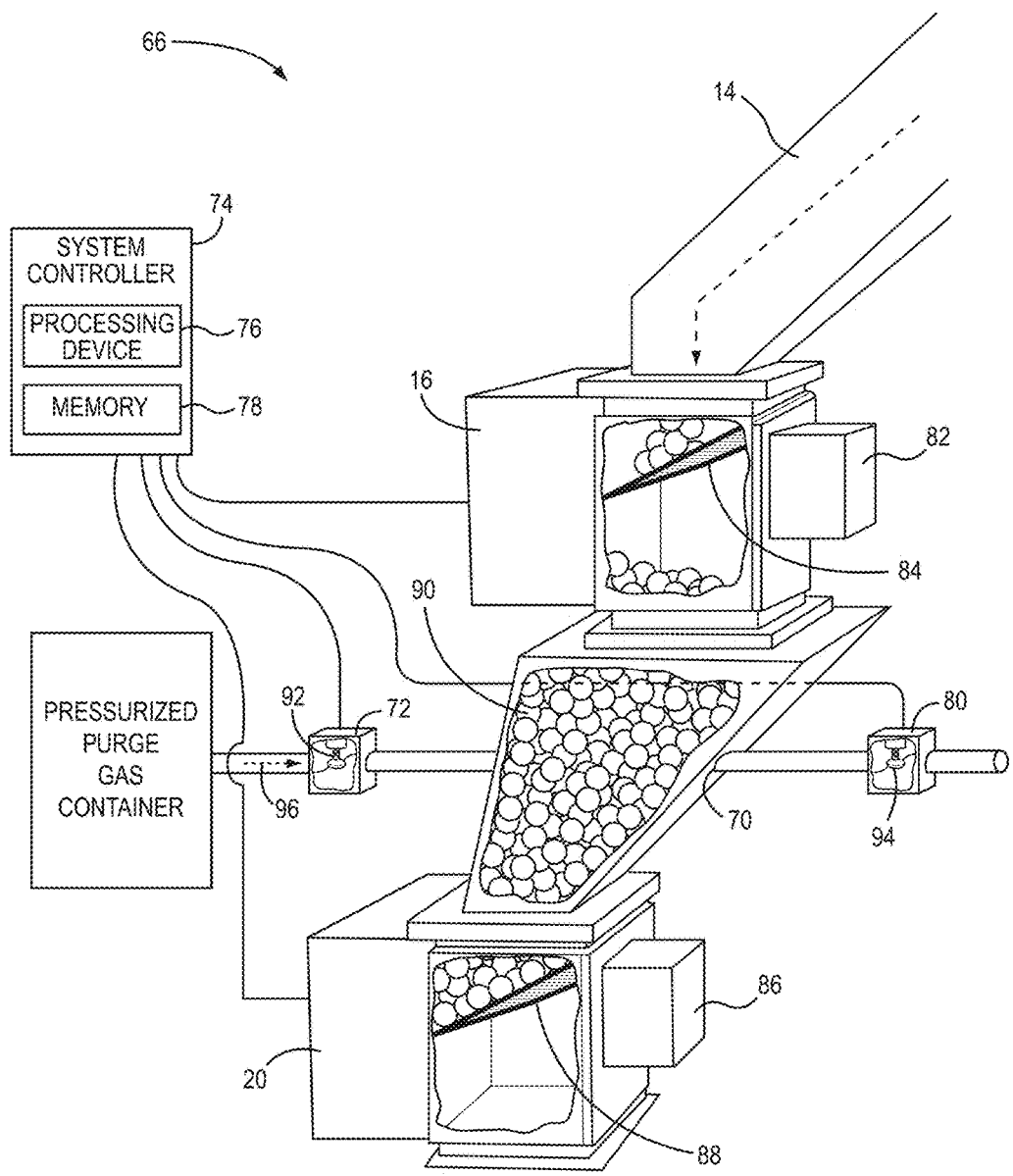

FIG. 5F illustrates a next stage of the cycle according to one embodiment. After a second period of time, the system controller 74 initiates signals to control the purge gas inlet mechanism 72 to close the purge gas inlet valve 92. The purge gas outlet valve 94, the receiving flap 84, and the discharging flap 88 remain closed.

Figure 5G:
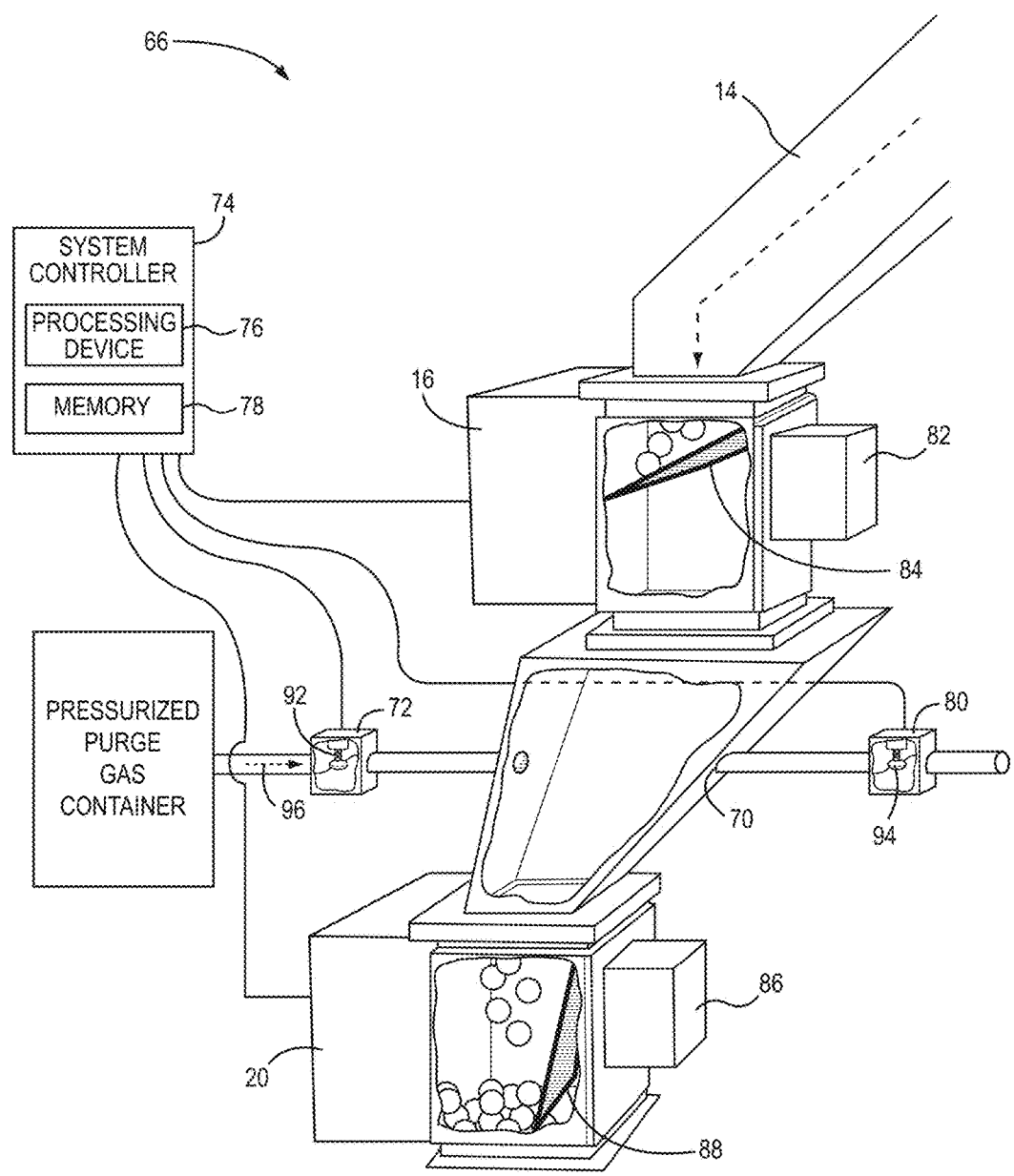

FIG. 5G illustrates a next stage of the cycle according to one embodiment. The system controller 74 initiates signals to control the discharging flap mechanism 20 to open the discharging flap 88 to allow the first plurality of heat carriers 90 to be discharged via gravity from the gravity-fed housing 18.

Figure 5H:
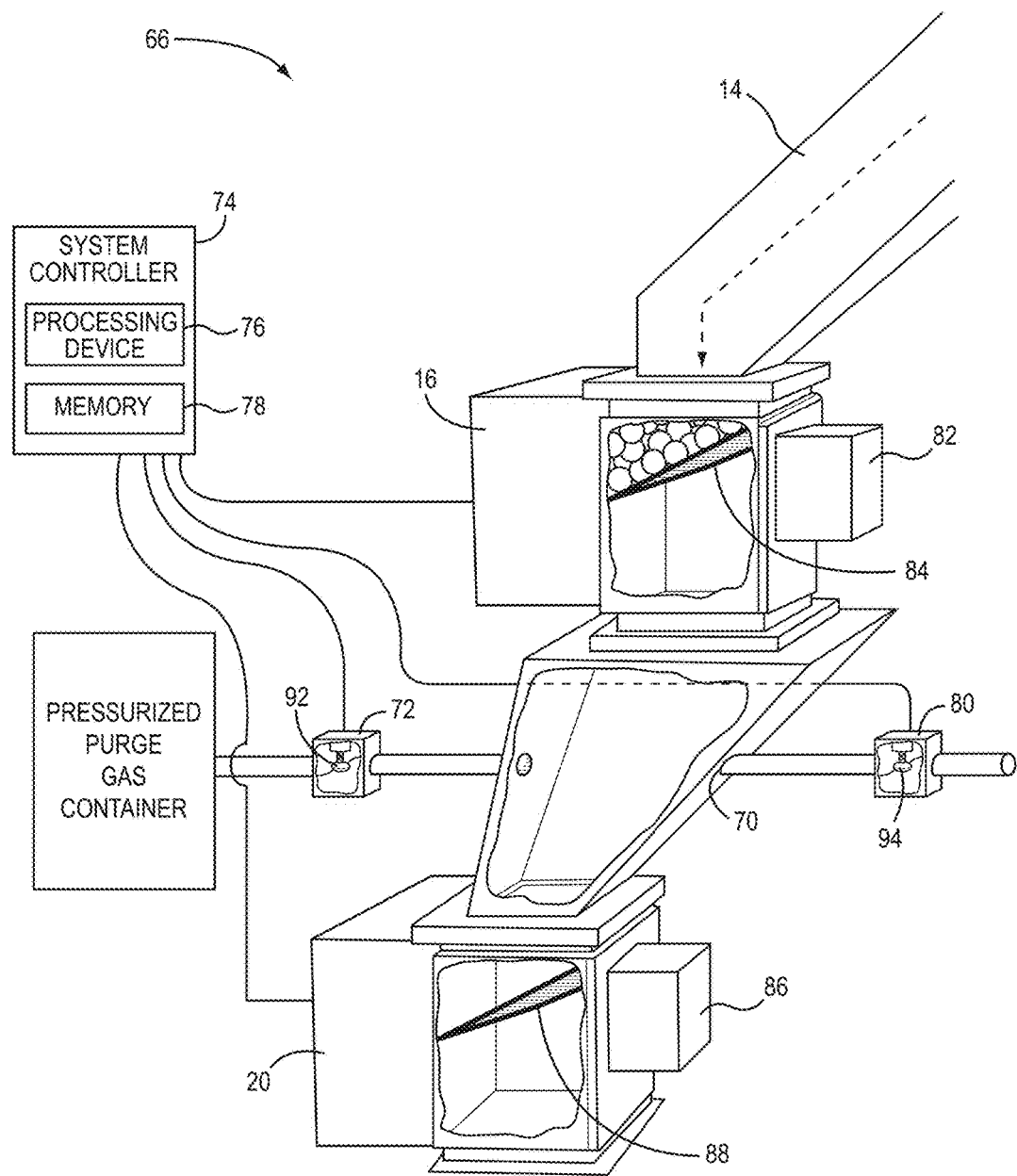

FIG. 5H illustrates a next stage of the cycle according to one embodiment. The system controller 74 initiates signals to control the discharging flap mechanism 20 to close the discharging flap 88. The purge gas inlet valve 92, the purge gas outlet valve 94, and the receiving flap 84 remain closed.

Figure 5I:
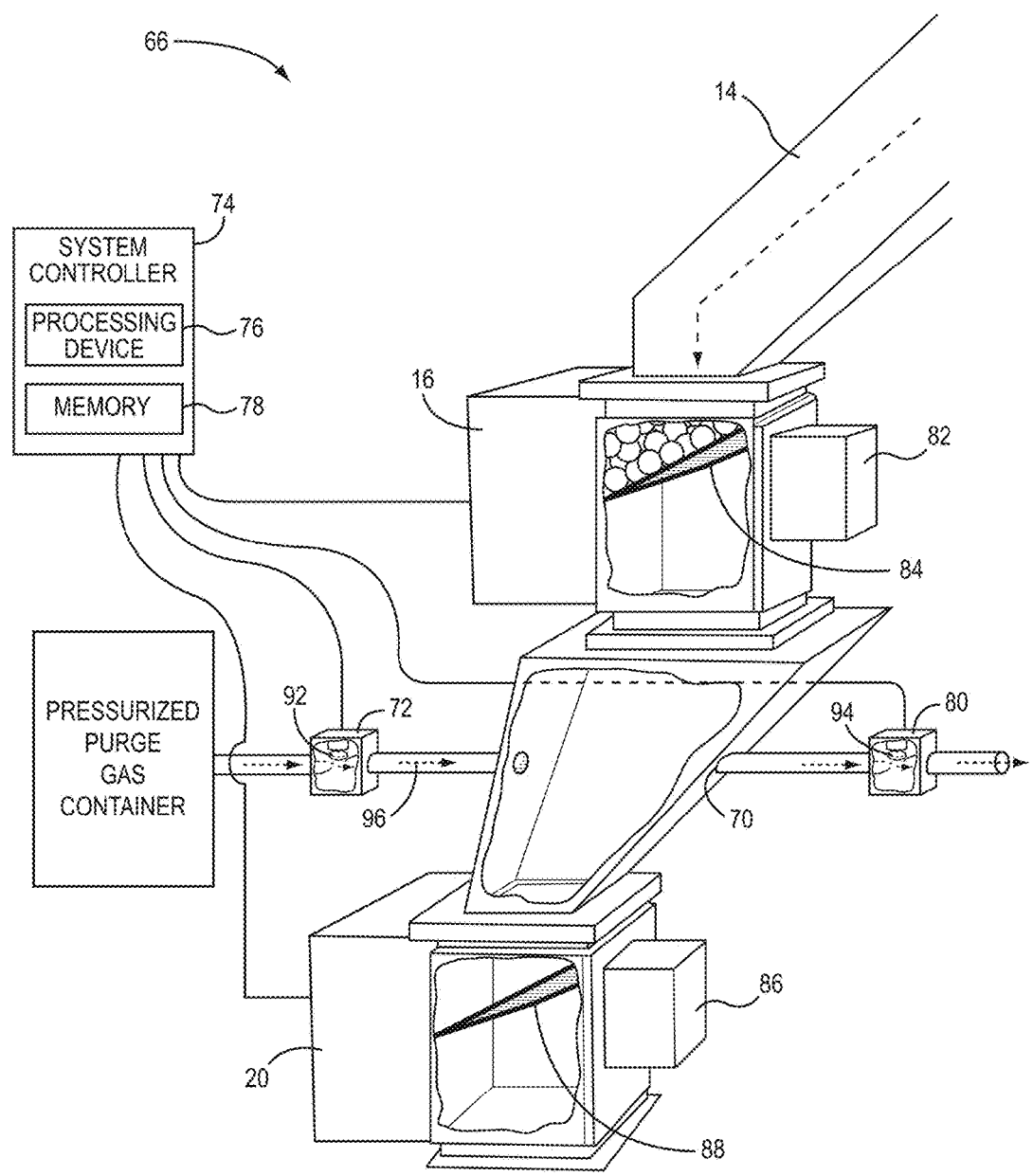

FIG. 5I illustrates a next stage of the cycle according to one embodiment. The system controller 74 initiates signals to control the purge gas inlet mechanism 72 and the purge gas outlet mechanism 80 to open the purge gas inlet valve 92 and the purge gas outlet valve 94. The receiving flap 84 and the discharging flap 88 remain closed. The purge gas 96 enters the gravity-fed housing 18 and flushes any gases that may have entered the gravity-fed housing 18 when the discharging flap 88 opened from the gravity-fed housing 18 out the purge gas outlet valve 94.

Figure 5J:
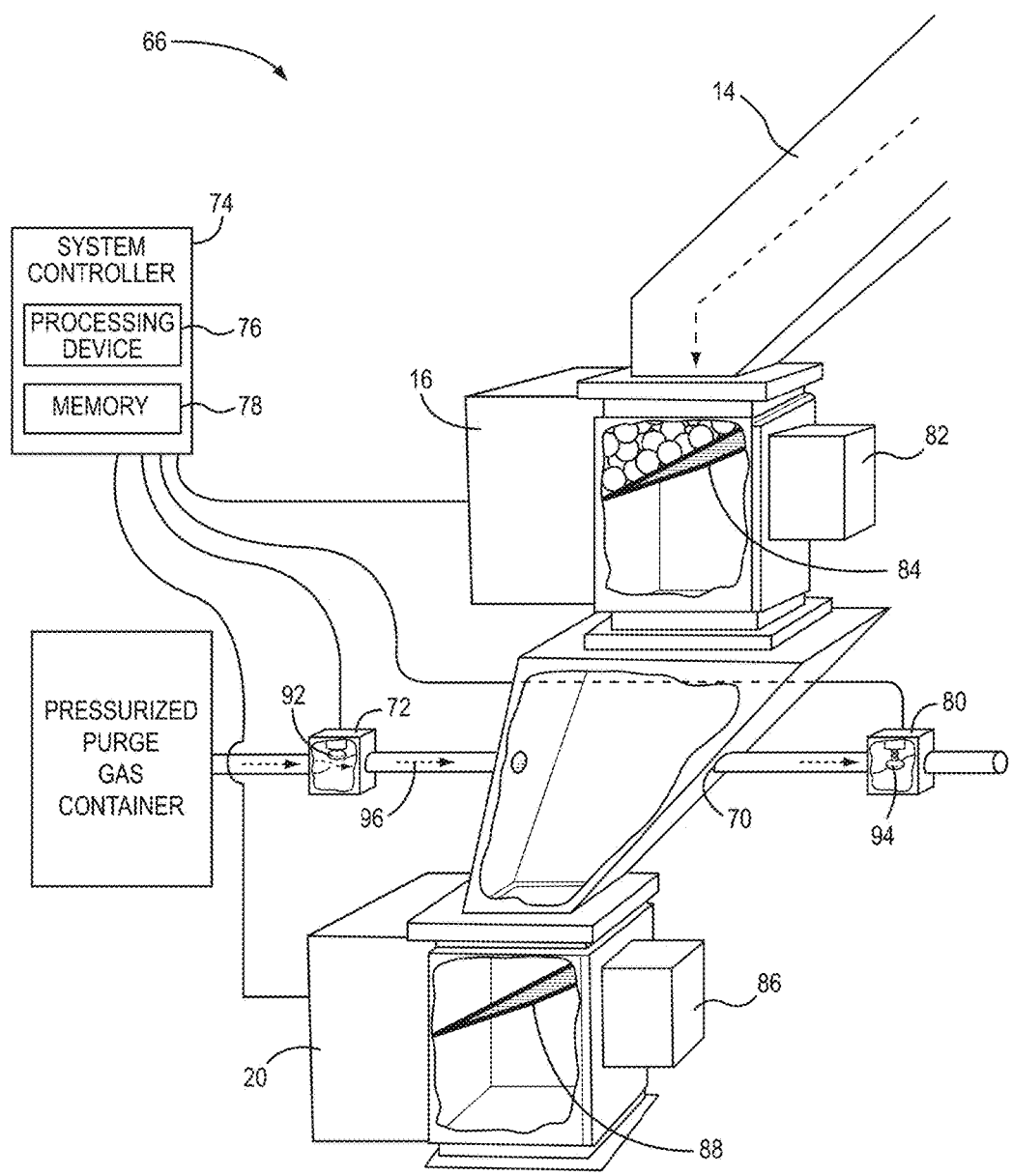

FIG. 5J illustrates a next stage of the cycle according to one embodiment. The system controller 74 initiates signals to control the purge gas outlet mechanism 80 to close the purge gas outlet valve 94. The purge gas inlet valve 92 remains open for a period of time. The receiving flap 84 and the discharging flap 88 remain closed.

Figure 5K:
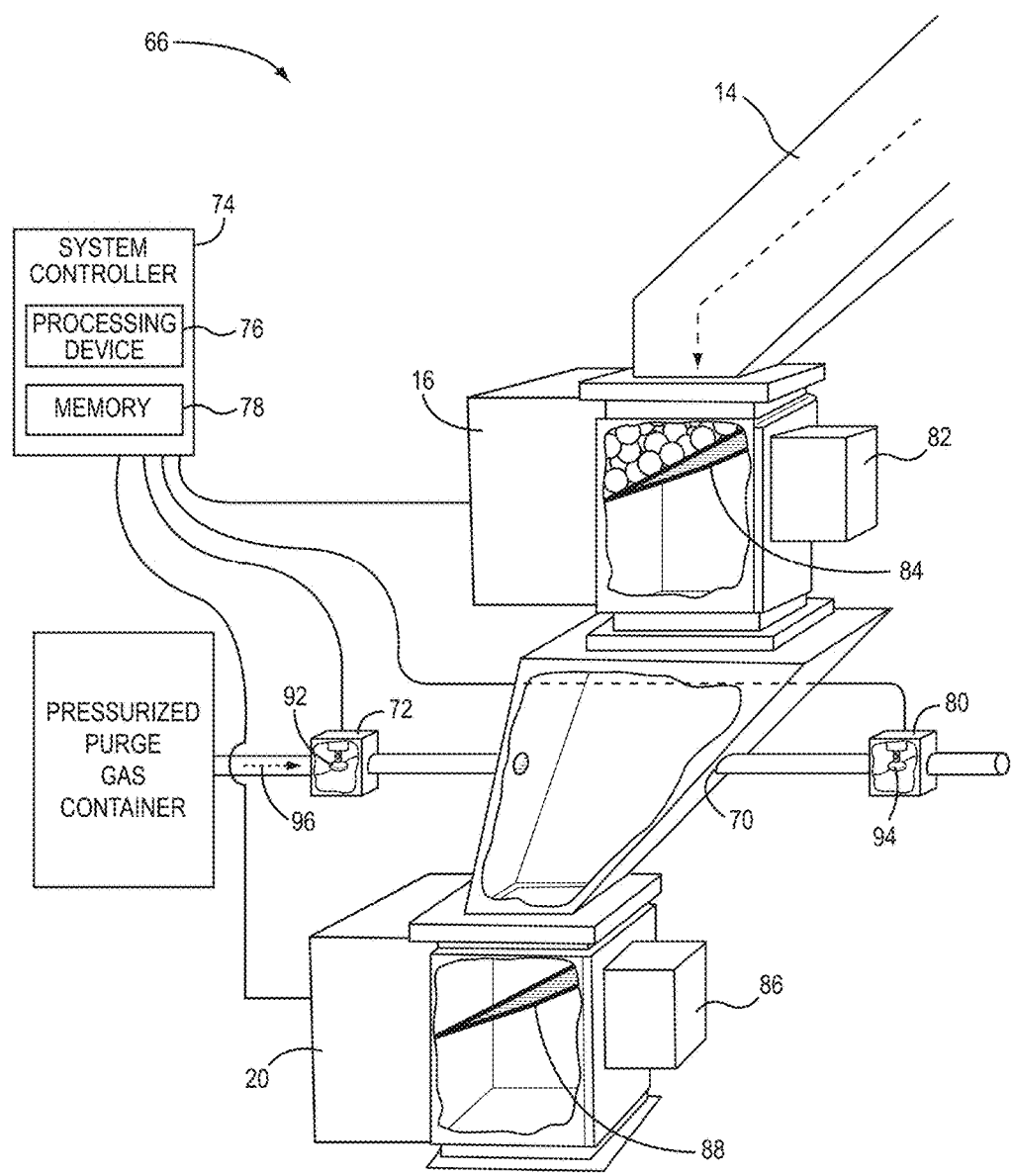

FIG. 5K illustrates a final stage of the cycle according to one embodiment. The system controller 74 initiates signals to control the purge gas inlet mechanism 72 to close the purge gas inlet valve 92. The purge gas outlet valve 94, the receiving flap 84, and the discharging flap 88 remain closed. The cycle may now be repeated.

Figure 6:
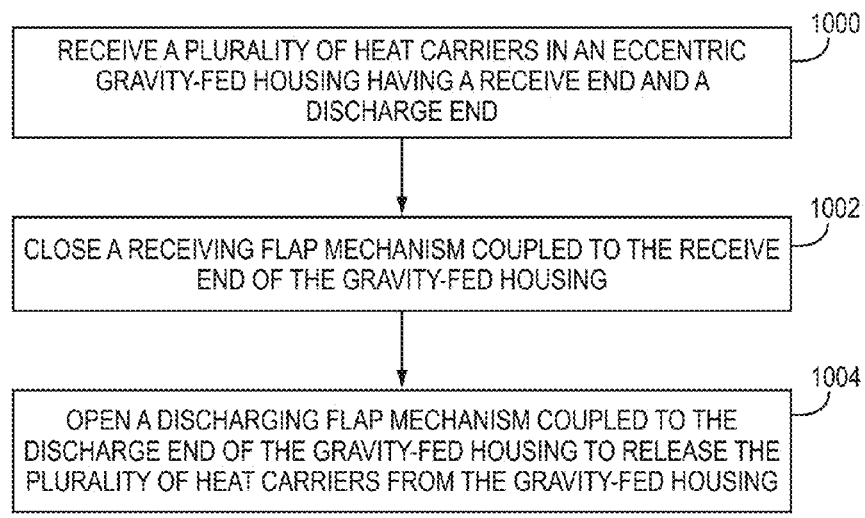
FIG. 6 is a flowchart of a process according to one embodiment.

FIG. 6 is a flowchart of a process according to one embodiment. FIG. 6 will be discussed in conjunction with FIGS. 3 and 4. Initially, a plurality of heat carriers is received in the gravity-fed housing 18 (FIG. 6, block 1000). The gravity-fed housing 18 has the receive end 32 and the discharge end 34. The gravity-fed housing 18 includes the receiving end panel 36 that forms the receive opening 38. The siding 42 is connected to the receiving end panel 36 and forms the chamber 44 and the discharge opening 46. The discharge opening 46 is offset with respect to the receive opening 38 such that the line 49 perpendicular to the receiving end panel 36 that extends through a center point 50 of the receive opening 38 does not intersect a center point 52 of the discharge opening 46. The siding 42 includes the first panel 53 that comprises the guiding surface 54 that intersects the line 49 that extends through the center point 50 of the receive opening 38 and is angled in the direction 55 toward the discharge opening 46.

The receiving flap mechanism 16 is closed (FIG. 6, block 1002). The discharging flap mechanism 20 is opened to release the plurality of heat carriers from the gravity-fed housing 18 (FIG. 6, block 1004).

Those skilled in the art will recognize improvements and modifications to the preferred embodiments of the disclosure. All such improvements and modifications are considered within the scope of the concepts disclosed herein and the claims that follow.

What is claimed is:

1. A system comprising:
a gravity-fed housing having a receive end and a discharge end, comprising:
a receiving end panel that forms a receive opening in a first plane, the receive opening being configured to receive a first plurality of heat carriers via gravity; and
a siding connected to the receiving end panel, the siding forming a chamber and a discharge opening in a second plane that is parallel to the first plane, the discharge opening being offset with respect to the receive opening such that a line perpendicular to the receiving end panel that extends through a center point of the receive opening does not intersect a center point of the second opening, the siding including a first panel that comprises a guiding surface that intersects the line and is angled in a direction toward the discharge opening;
a receiving flap mechanism coupled to the receive end of the gravity-fed housing, comprising:
a controller; and
a receiving flap;
wherein the controller is configured to:
selectively open the receiving flap to release the first plurality of heat carriers into the gravity-fed housing via the receive opening, and close the receiving flap to inhibit entry of additional heat carriers into the gravity-fed housing;
a discharging flap mechanism coupled to the discharge end of the gravity-fed housing, comprising:
a discharging flap;
wherein the controller is configured to:
selectively close the discharging flap to house the first plurality of heat carriers in the gravity-fed housing and inhibit discharge of the first plurality of heat carriers from the gravity-fed housing, and subsequently selectively open the discharging flap to release the first plurality of heat carriers from the gravity-fed housing.

2. The system of claim 1, wherein the siding further comprises a second panel, a third panel, and a fourth panel, the second panel opposing the first panel and being in a plane that is non-perpendicular to the first plane, the third panel and the fourth panel opposing one another and being perpendicular to the first plane.

3. The system of claim 2, wherein the siding forms a purge gas inlet configured to allow a purge gas to enter the gravity-fed housing, and a purge gas outlet that is separate from the receive opening and the discharge opening and that is configured to allow the purge gas to be discharged from the gravity-fed housing.

4. The system of claim 1, wherein the receiving flap, when in a closed position, forms a fluid-tight seal configured to prevent gas from entering or exiting the system via the receiving flap mechanism.

5. The system of claim 1, wherein the discharging flap, when in a closed position, forms a fluid-tight seal configured to prevent gas from entering or exiting the system via the discharging flap mechanism.

6. The system of claim 1, wherein the siding forms a purge gas inlet configured to allow a purge gas to enter the gravity-fed housing, and a purge gas outlet that is separate from the receive opening and the discharge opening and that is configured to allow the purge gas to be discharged from the gravity-fed housing.

7. The system of claim 6, further comprising:
a purge gas inlet mechanism comprising:
   a purge gas inlet controller; and
   a purge gas inlet valve;
   wherein the purge gas inlet controller is configured to:
selectively open the purge gas inlet valve to allow entry of the purge gas into the gravity-fed housing, and close the purge gas inlet valve to prevent entry of the purge gas into the gravity-fed housing.

8. The system of claim 7, further comprising:
a purge gas outlet mechanism comprising:
   a purge gas outlet controller; and
   a purge gas outlet valve;
   wherein the purge gas outlet controller is configured to:
selectively open the purge gas outlet valve to allow discharge of the purge gas from the gravity-fed housing, and close the purge gas outlet valve to prevent discharge of the purge gas from the gravity-fed housing.

9. The system of claim 8, further comprising a system controller, the system controller communicatively coupled to the receiving flap mechanism, the discharging flap mechanism, the purge gas inlet mechanism, and the purge gas outlet mechanism, and configured to:
   control the receiving flap mechanism, the discharging flap mechanism, the purge gas inlet mechanism, and the purge gas outlet mechanism to:
      close the purge gas inlet valve and the purge gas outlet valve;
      close the discharging flap; and
      open the receiving flap to allow the first plurality of heat carriers to enter the chamber.

10. The system of claim 9, wherein the system controller is further configured to:
   control the receiving flap mechanism, the discharging flap mechanism, the purge gas inlet mechanism, and the purge gas outlet mechanism to:
      close the receiving flap;
      open the purge gas inlet valve and the purge gas outlet valve for a first period of time;
      close the purge gas outlet valve;
      close the purge gas inlet value; and
      open the discharging flap to allow the first plurality of heat carriers to be discharged via gravity from the chamber.

11. The system of claim 10, wherein the system controller is further configured to:
   control the receiving flap mechanism, the discharging flap mechanism, the purge gas inlet mechanism, and the purge gas outlet mechanism to:
      close the discharging flap mechanism;
      open the purge gas inlet valve and the purge gas outlet valve for a first period of time;
      close the purge gas outlet valve;
      close the purge gas inlet value; and
      open the receiving flap mechanism to allow a second plurality of heat carriers to enter the chamber.

12. The system of claim 1, wherein the plurality of heat carriers have an angle of repose, and wherein the guiding surface is at an angle with respect to the second plane greater than the angle of repose.

13. A system comprising:
a gravity-fed housing having a receive end and a discharge end, comprising:
   a receiving end panel that forms a receive opening in a first plane, the receive opening being configured to receive a first plurality of heat carriers via gravity; and
   a siding connected to the receiving end panel, the siding forming a chamber and a discharge opening in a second plane that is parallel to the first plane, the discharge opening being offset with respect to the receive opening such that a line perpendicular to the receiving end panel that extends through a center point of the receive opening does not intersect a center point of the second opening, the siding including a first panel that comprises a guiding surface that intersects the line and is angled in a direction toward the discharge opening, the siding forming a purge gas inlet configured to allow a purge gas to enter the gravity-fed housing, and a purge gas outlet that is separate from the receive opening and the discharge opening and that is configured to allow the purge gas to be discharged from the gravity-fed housing.

14. The system of claim 13, further comprising:
a purge gas inlet mechanism comprising:
   a purge gas inlet controller; and
   a purge gas inlet valve;
   wherein the purge gas inlet controller is configured to:
selectively open the purge gas inlet valve to allow entry of the purge gas into the gravity-fed housing, and close the purge gas inlet valve to prevent entry of the purge gas into the gravity-fed housing.

15. The system of claim 14, further comprising:
a purge gas outlet mechanism comprising:
   a purge gas outlet controller; and
   a purge gas outlet valve;
   wherein the purge gas outlet controller is configured to:
selectively open the purge gas outlet valve to allow discharge of the purge gas from the gravity-fed housing, and close the purge gas outlet valve to prevent discharge of the purge gas from the gravity-fed housing.

16. The system of claim 15, further comprising a system controller, the system controller communicatively coupled to the receiving flap mechanism, the discharging flap mechanism, the purge gas inlet mechanism, and the purge gas outlet mechanism, and configured to:
   control the receiving flap mechanism, the discharging flap mechanism, the purge gas inlet mechanism, and the purge gas outlet mechanism to:
      close the purge gas inlet valve and the purge gas outlet valve;
      close the discharging flap; and
      open the receiving flap to allow the first plurality of heat carriers to enter the chamber.

17. The system of claim 16, wherein the system controller is further configured to:
   control the receiving flap mechanism, the discharging flap mechanism, the purge gas inlet mechanism, and the purge gas outlet mechanism to:
      close the receiving flap;
      open the purge gas inlet valve and the purge gas outlet valve for a first period of time;
      close the purge gas outlet valve;
      close the purge gas inlet value; and
      open the discharging flap to allow the first plurality of heat carriers to be discharged via gravity from the chamber.

18. The system of claim 17, wherein the system controller is further configured to:

control the receiving flap mechanism, the discharging flap mechanism, the purge gas inlet mechanism, and the purge gas outlet mechanism to:
close the discharging flap mechanism;
open the purge gas inlet valve and the purge gas outlet valve for a first period of time;
close the purge gas outlet valve;
close the purge gas inlet value; and
open the receiving flap mechanism to allow a second plurality of heat carriers to enter the chamber.

* * * * *